(12) United States Patent
Hecht (10) Patent No.: US 11,938,549 B2
(45) Date of Patent: Mar. 26, 2024

(54) TOOL COUPLING

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 708 days.

(21) Appl. No.: 17/073,617

(22) Filed: Oct. 19, 2020

(65) Prior Publication Data

US 2022/0118527 A1    Apr. 21, 2022

(51) Int. Cl.
*B23B 29/04* (2006.01)
*F16B 2/06* (2006.01)
*F16B 2/18* (2006.01)

(52) U.S. Cl.
CPC ............ *B23B 29/046* (2013.01); *F16B 2/065* (2013.01); *F16B 2/18* (2013.01); *Y10T 403/7067* (2015.01)

(58) Field of Classification Search
CPC ... B23B 29/046; B23B 29/244; B23B 29/246; B23B 31/103; B23B 31/1075; B23B 31/1078; B23B 31/11; B23B 2231/40; F16B 2/065; F16B 2/18; F16B 12/2036; F16B 21/00; F16B 21/02; F16B 21/10; F16B 21/16; F16B 2012/2018; F16B 2012/2072; Y10S 403/04; Y10S 403/08; Y10T 403/58; Y10T 403/589; Y10T 403/59; Y10T 403/591; Y10T 403/597; Y10T 403/60; Y10T 403/608; Y10T 403/68; Y10T 403/7009; Y10T 403/7067

(Continued)

(56) References Cited

U.S. PATENT DOCUMENTS

| 1,422,058 | A |  | 7/1922 | Hovanec |
| 2,874,388 | A | * | 2/1959 | Edelen, Sr. ............. F16B 12/60 403/297 |

(Continued)

FOREIGN PATENT DOCUMENTS

EP    3292931    3/2018

OTHER PUBLICATIONS

International Search Report dated Jan. 12, 2022, issued in PCT counterpart application (No. PCT/IL2021/051176).

(Continued)

*Primary Examiner* — Josh Skroupa
(74) *Attorney, Agent, or Firm* — Womble Bond Dickinson (US) LLP (57) ABSTRACT

A tool coupling extends along a longitudinal axis and has a first component, a second component, and a clamp for fastening the first component to the second component. The first component has a male clamping portion, the second component has a female clamping portion, and the clamp is located in an inner cavity of the second component. The male clamping portion has a first abutment region located axially rearward of a first plane perpendicular to the longitudinal axis, the inner cavity has a second abutment region located axially forward of the first plane, and the first and second abutment regions face towards the first plane. In a fastened state, a clamp first engagement region of the clamp makes clamping contact with the male clamping portion's first abutment region, and a clamp second engagement region of the clamp makes clamping contact with the inner cavity's second abutment region.

27 Claims, 8 Drawing Sheets

(58) Field of Classification Search
USPC .... 403/315, 320, 321, 322.1, 323, 326, 330, 403/343, 350, 374.3, DIG. 4, DIG. 8
See application file for complete search history.

(56) References Cited

U.S. PATENT DOCUMENTS

| | | | | |
|---|---|---|---|---|
| 3,565,469 | A * | 2/1971 | Zwart | E04B 1/6183 |
| | | | | 52/582.2 |
| 4,662,254 | A * | 5/1987 | Noggle | B23B 29/046 |
| | | | | 407/101 |
| 4,687,237 | A * | 8/1987 | Bisbing | E05C 19/02 |
| | | | | 292/78 |
| 4,826,345 | A * | 5/1989 | Salice | F16B 12/26 |
| | | | | 403/330 |
| 5,060,989 | A * | 10/1991 | Gallucci | F16L 21/08 |
| | | | | 403/330 |
| 5,237,146 | A * | 8/1993 | Buchler | B23H 7/26 |
| | | | | 403/330 |
| 5,288,182 | A * | 2/1994 | Patterson | B23B 31/1078 |
| | | | | 408/232 |
| 5,873,682 | A | 2/1999 | Tripsa | |
| 6,179,303 | B1 | 1/2001 | Jansen | |
| 6,270,293 | B2 | 8/2001 | Erickson et al. | |
| 6,386,806 | B1 | 5/2002 | Planche | |
| 7,810,220 | B2 * | 10/2010 | Anthony | F16B 45/02 |
| | | | | 24/599.7 |
| 8,220,885 | B2 * | 7/2012 | Weber | F16B 12/26 |
| | | | | 312/348.4 |
| 9,273,708 | B2 * | 3/2016 | Urban | F16B 2/12 |
| 9,597,737 | B2 | 3/2017 | Hecht | |

OTHER PUBLICATIONS

Written Opinion dated Jan. 12, 2022, issued in PCT counterpart application (No. PCT/IL2021/051176).

* cited by examiner

TOOL COUPLING

FIELD OF THE INVENTION

The present invention relates to a tool coupling for use in metal cutting processes in general, and for turning operations in particular.

BACKGROUND OF THE INVENTION

Within the field of cutting tools used in turning operations, there are many examples of a tool couplings, some in which a cutting insert is coupled directly to a tool holder, and others in which a tool adaptor, housing a cutting insert, is coupled to a tool shank.

U.S. Pat. No. 5,873,682 discloses a tool holder comprising a body having a channel formed therein for receiving a finger that extends from a head. The finger is secured within the channel by an assembly screw that permits the head to move between a retracted position and an extended position relative to the body. When the head is in its extended position, the head is permitted to pivot relative to the body; however, when the head is in its retracted position a pair of shoulders on the body engage a pair of notches on the head, preventing the head from pivoting. A locking screw is also provided that locks the head to the body. The locking screw is designed so that as the locking screw is tightened, the head is urged against the body, thus providing a positive known position for the insert each time the head is moved.

U.S. Pat. No. 6,270,293 B2 discloses an apparatus for releasably holding a toolholder, comprising a tool support member having a forwardly facing surface, a bore along a longitudinal axis and a passageway. The bore intersects the forwardly facing surface and extends rearwardly therefrom for receiving the toolholder and the passageway extends through the tool support member and intersects the longitudinal axis. An actuating bolt extends through the tool support member within the passageway and is reciprocally movable between a locking position and a releasing position along a radial axis relative to the longitudinal axis for locking or ejecting a shank into or from the tool support member. The actuating bolt has a locking segment for abutting and urging rearwardly the locking surface of the shank of the toolholder to lock the toolholder within the tool support member.

EP 3292931 A1 discloses a cutting tool, with a base holder and an interchangeable head which carries a cutting edge and has a pin which is inserted into a corresponding recess at one end of the base holder. A clamping jaw attached to a side of the base holder clamps the pin in the recess by means of a base holder screw. The pin includes at least one support surface for receiving a pressure surface provided on the clamping claw.

SUMMARY OF THE INVENTION

In accordance with the present invention, there is provided a tool coupling extending in a forward-to-rearward direction along a longitudinal axis, and having a first plane perpendicular to the longitudinal axis and a second plane containing the longitudinal axis and transverse to the first plane, the second plane having an upper side defining an upward direction of the tool coupling and a lower side which is opposite to the upper side and defines a downward direction of the tool coupling, the tool coupling comprising:
a first component, a second component, and a clamp for fastening the first component to the second component,
the first component having a first body portion and a male clamping portion extending from a rear mating end of the first body portion in the rearward direction,
the second component having a second body portion, a female clamping portion, and an inner cavity, the female clamping portion opening out to a forward mating end of the second body portion and the inner cavity communicating with the female clamping portion, and
the clamp located in the inner cavity and having a clamp forward engagement portion and a clamp rear drive portion, the clamp forward engagement portion having a clamp first engagement region and a clamp second engagement region, wherein:
the male clamping portion occupies the female clamping portion and has a first abutment region located axially rearward of the first plane;
the inner cavity has a second abutment region located axially forward of the first plane, the second abutment region being located on the upper side of the second plane;
each of the first and second abutment regions faces towards the first plane; and
in a fastened state of the tool coupling:
a rear mating surface of the rear mating end makes clamping contact with a forward mating surface of the forward mating end;
the clamp first engagement region makes clamping contact with the male clamping portion's first abutment region; and
the clamp second engagement region makes clamping contact with the inner cavity's second abutment region.

BRIEF DESCRIPTION OF THE DRAWINGS

For a better understanding, the invention will now be described, by way of example only, with reference to the accompanying drawings in which chain-dash lines represent cut-off boundaries for partial views of a member and in which:

FIG. 10b is a detailed view of the tool coupling shown in FIG. 10a;

FIG. 13b is a detailed view of the tool coupling shown in FIG. 13a.

DETAILED DESCRIPTION OF THE INVENTION

Figure 1:
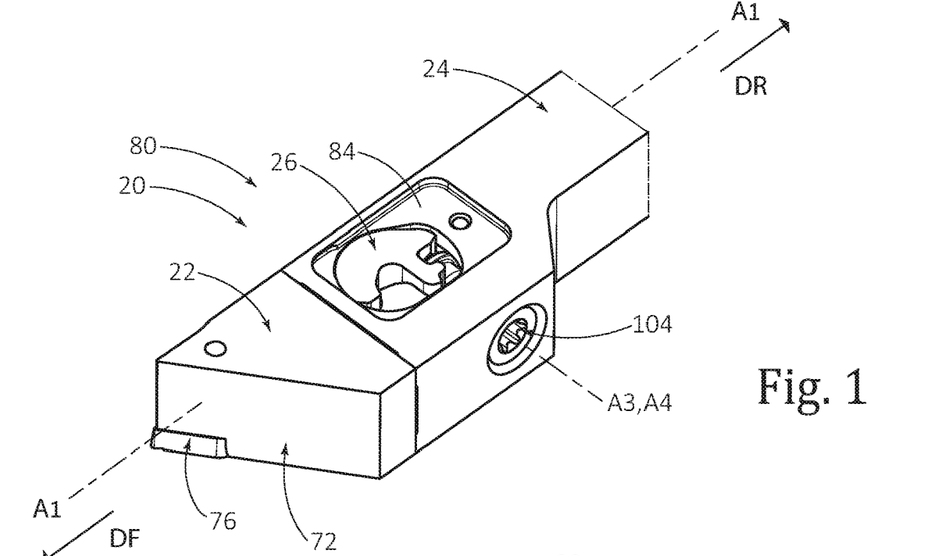
FIG. 1 is a perspective view of a tool coupling in accordance with some embodiments of the present invention.
Figure 2:
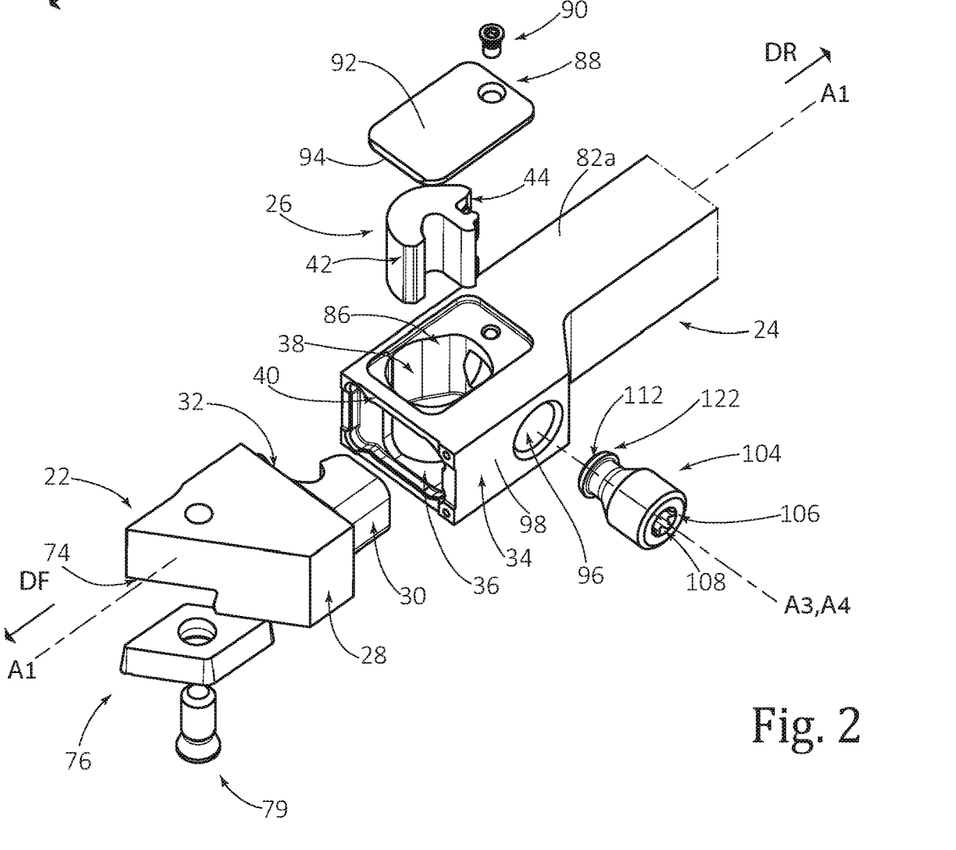
FIG. 2 is an exploded perspective view of a tool coupling shown in FIG. 1.
Figure 3:
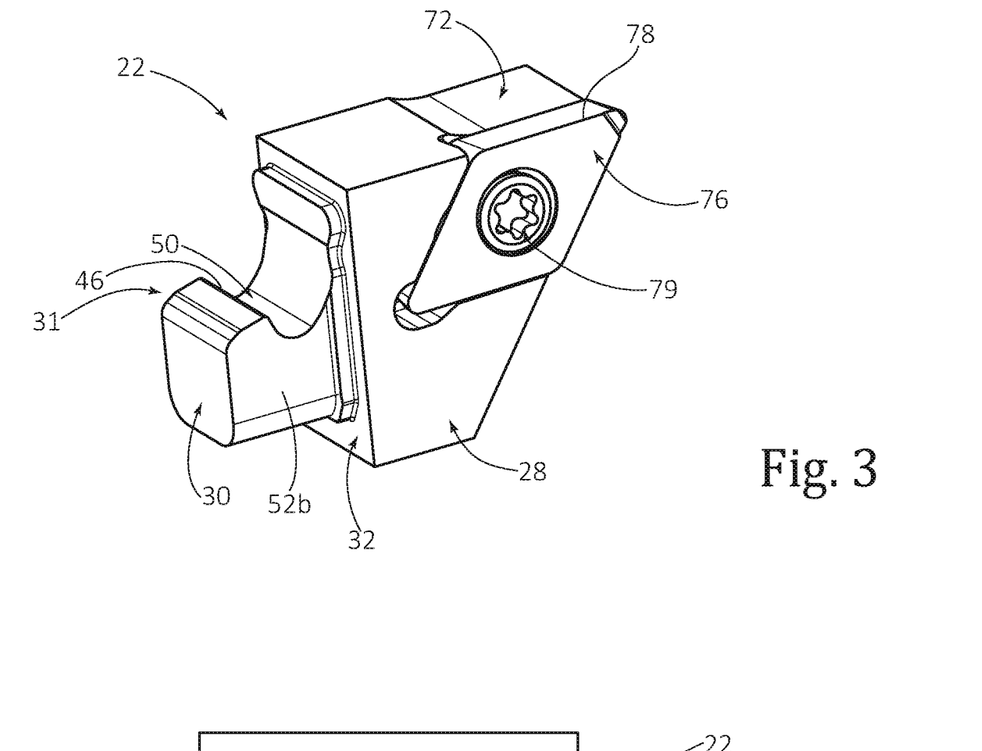
FIG. 3 is a perspective view of a first component of the tool coupling shown in FIGS. 1 and 2.

As shown in FIGS. 1 and 2, the present invention relates to a tool coupling 20 extending in a forward-to-rearward direction DF, DR along a longitudinal axis A1, comprising a first component 22 (forward component 22), a second component 24 (rear component 24), and a clamp 26 for fastening the first component 22 to the second component 24.

In some embodiments of the present invention, the second component 24 and the clamp 26 may be manufactured from tool steel.

Also, in some embodiments of the present invention, the second component 24 and the clamp 26 may be produced by means of additive manufacturing.

As shown in FIGS. 1 to 4, the first component 22 has a first body portion 28 and a male clamping portion 30, which extends from a rear mating end 32 of the first body portion 28 in the rearward direction DR.

As shown in FIGS. 1, 2, 5 and 6, the second component 24 has a second body portion 34, a female clamping portion 36, and an inner cavity 38, and the female clamping portion 36 opens out to a forward mating end 40 of the second body portion 34 and the inner cavity 38 communicates with the female clamping portion 36.

As shown in FIGS. 1, 2, 7 and 8, the clamp 26 is located in the inner cavity 38 and has a clamp forward engagement portion 42 and a clamp rear drive portion 44.

In some embodiments of the present invention, the clamp rear drive portion 44 may be distally located from the clamp forward engagement portion 42.

In some embodiments of the present invention, the clamp 26 may be of unitary one-piece construction.

On assembly of the tool coupling 20, as shown in FIGS. 9 to 12, the male clamping portion 30 occupies the female clamping portion 36, a first abutment region 46 of the male clamping portion 30 is located axially rearward of a first plane P1 perpendicular to the longitudinal axis A1, and a second abutment region 48 of the inner cavity 38 is located axially forward of the first plane P1.

In some embodiments of the present invention, the first plane P1 passes through the female clamping portion 36 and the inner cavity 38.

Figure 10A:
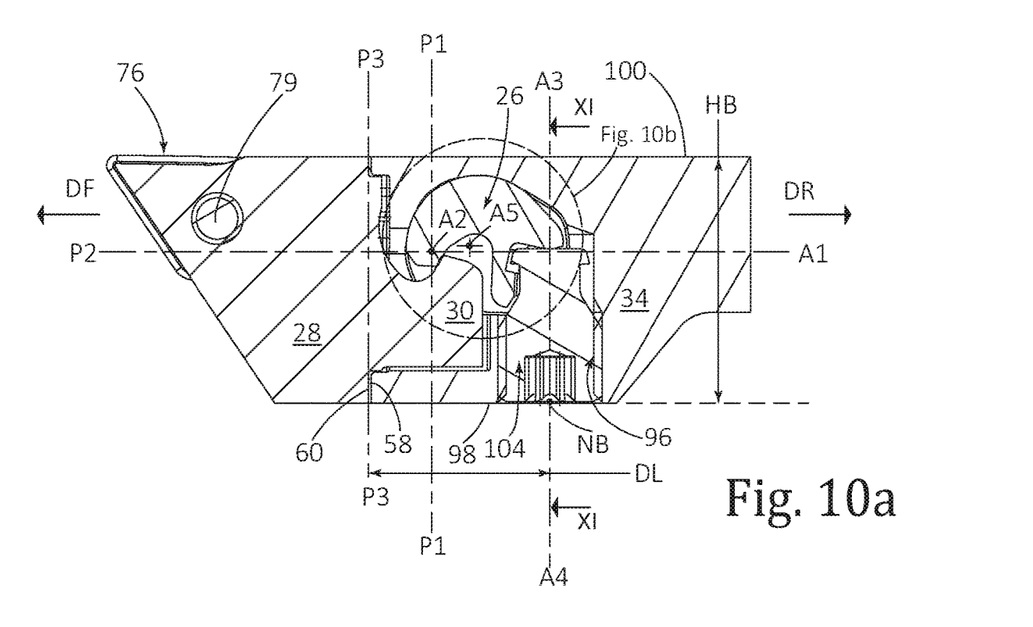
FIG. 10a is a cross-sectional view of the tool coupling shown in FIG. 9, taken along the line X-X, in a fastened state.
Figure 10B:
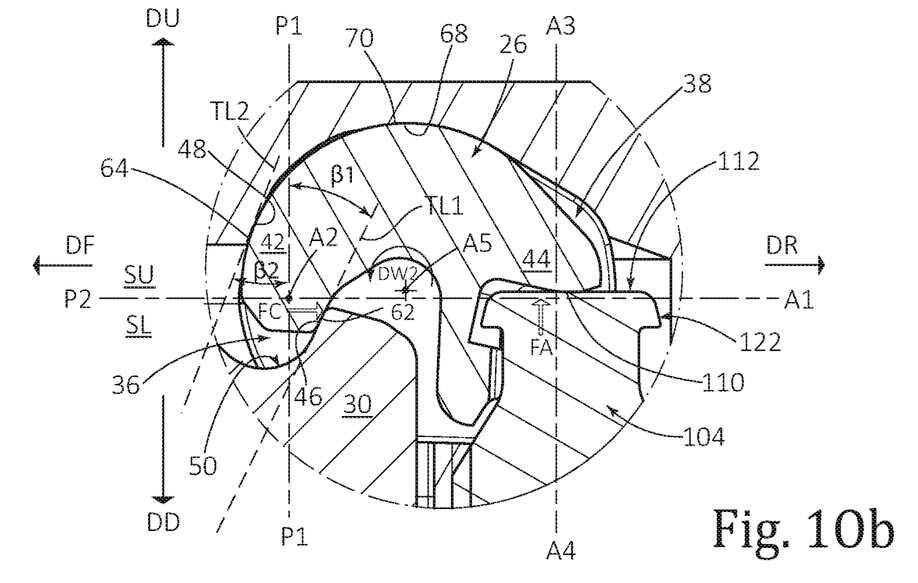
Figure 12:
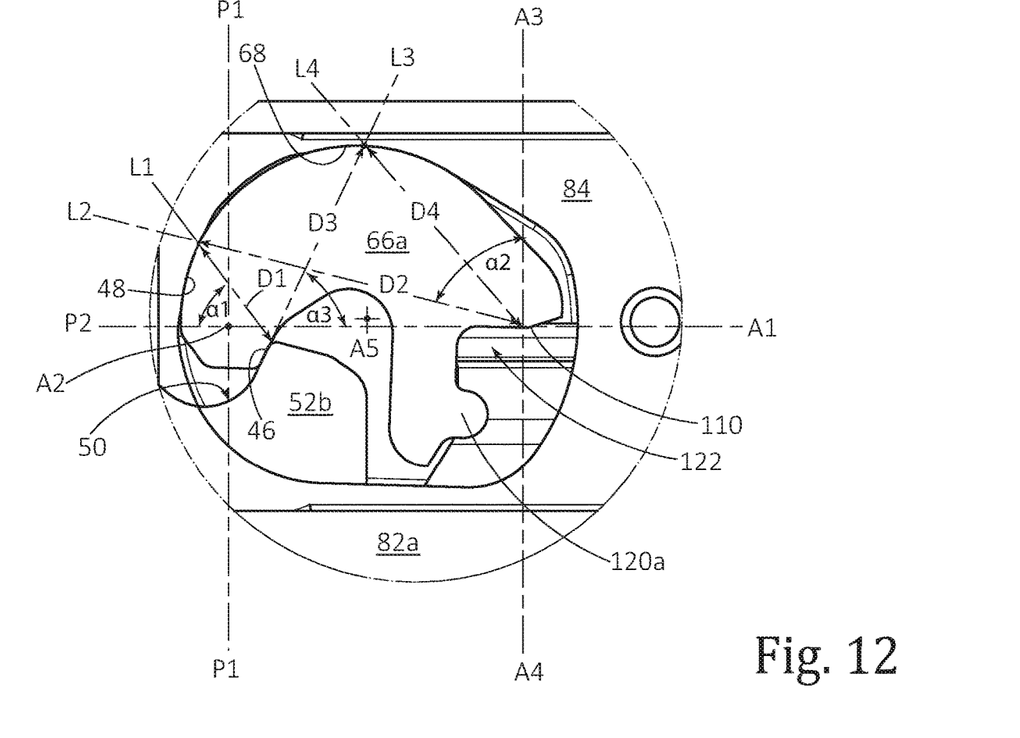
FIG. 12 is a detailed side view of the tool coupling shown in FIGS. 1 and 2, in the fastened state, with a side panel removed.

As shown in FIGS. 10b and 12, each of the first and second abutment regions 46, 48 faces towards the first plane P1.

It should be appreciated that use of the term "faces towards" throughout the description and claims, refers to a surface region at least partially facing towards a plane and does not require said surface region to perpendicularly face said plane.

In some embodiments of the present invention, the male clamping portion 30 may include a first undercut 50 with respect to the forward direction DF, and the first abutment region 46 may extend along the first undercut 50. By virtue of the first undercut 50, the rearward-facing male clamping portion 30 comprises a male hook 31 which, in the tool coupling 20, projects in the rearward direction DR.

It should be appreciated that use of the term "undercut" throughout the description and claims refers to a groove or recess, where a straight line extending in a certain direction away from a given region of the groove or recess intersects another region of the same groove or recess.

In some embodiments of the present invention, the first abutment region 46 may extend between opposing first and second outer side surfaces 52a, 52b of the male clamping portion 30.

Also, in some embodiments of the present invention, the first abutment region 46 may intersect the first and second outer side surfaces 52a, 52b.

Figure 4:
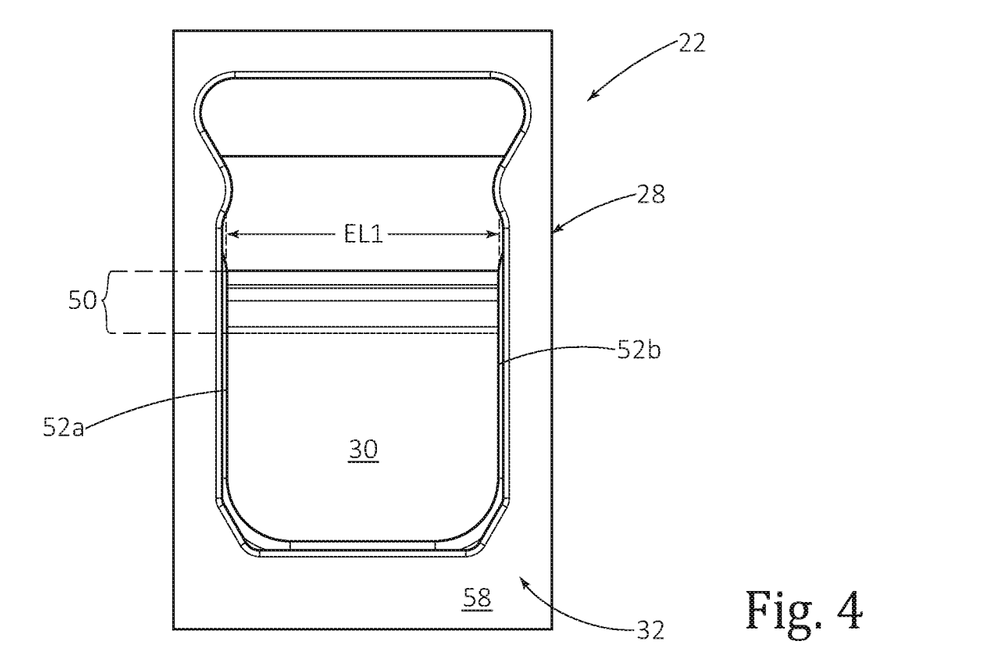
FIG. 4 is an end view of the first component shown in FIG. 3, with hidden detail.

As shown in FIG. 4, the first and second outer side surfaces 52a, 52b may be planar.

In some embodiments of the present invention, the inner cavity 38 may include a second undercut 54 with respect to the rearward direction DR, and the second abutment region 48 may extend along the second undercut 54.

Also in some embodiments of the present invention, the second abutment region 48 may extend between first and second inner side surfaces 56a, 56b of the inner cavity 38, although it should be appreciated that the second abutment region 48 may not extend the entire distance between the first and second inner side surfaces 56a, 56b.

The tool coupling 20 has a second plane P2 which contains the longitudinal axis A1 and is transverse to the first plane P1. The second plane P2 has an upper side SU defining an upward direction DU of the tool coupling 20 and a lower side SL which is opposite to the upper side SU and defines a downward direction DD of the tool coupling 20. The upward and downward directions DU, DD are opposite to one another, and perpendicular to the second plane P2.

In some embodiments of the present invention, the second plane P2 may be perpendicular to the first plane P1.

As shown in FIGS. 10a, 10b and 12, the second abutment region 48 is located on the upper side SU of the second plane P2.

In some embodiments of the present invention, the second abutment region 48 may face towards the second plane P2.

Also, in some embodiments of the present invention, the first abutment region 46 may be located on the lower side SL of the second plane P2.

Further, in some embodiments of the present invention, the first abutment region 46 may face towards the second plane P2.

Figure 11:
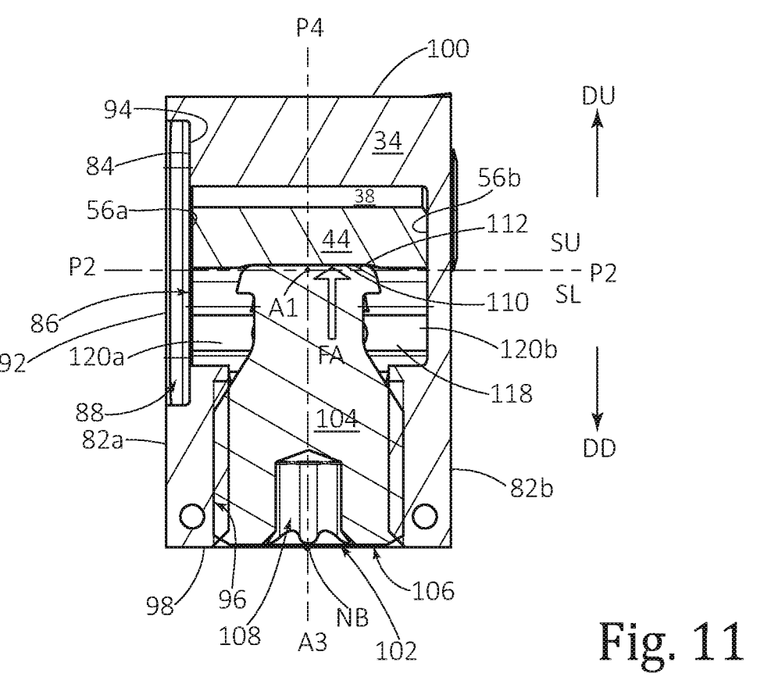
FIG. 11 is a cross-sectional view of the tool coupling shown in FIG. 10a, taken along the line XI-XI.

In a fastened state of the tool coupling 20, as shown in FIGS. 10 to 12:

a rear mating surface 58 of the rear mating end 32 of the first component 22 makes clamping contact with a forward mating surface 60 of the forward mating end 40 of the second component 24;

a clamp first engagement region 62 of the clamp forward engagement portion 42 makes clamping contact with the male clamping portion's first abutment region 46; and a clamp second engagement region 64 of the clamp forward engagement portion 42 makes clamping contact with the inner cavity's second abutment region 48.

It should be appreciated that in the fastened state of the tool coupling 20, the clamp forward engagement portion 42 may partially occupy the female clamping portion 36.

Figure 9:
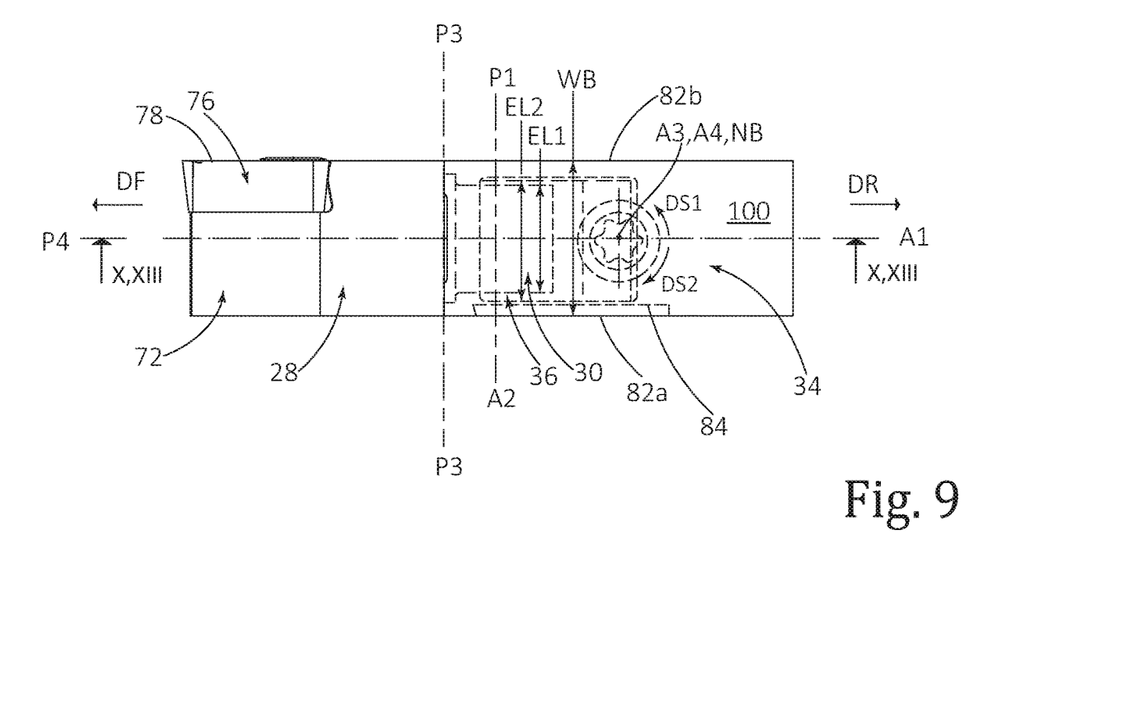
FIG. 9 is a top view of the tool coupling shown in FIGS. 1 and 2, with hidden detail.

As shown in FIGS. 9 and 10a, the rear mating surface 58 may define a third plane P3 parallel to and axially forward of the first plane P1.

For embodiments of the present invention in which the first and second abutment regions 46, 48 are disposed on the opposite lower and upper sides SL, SU, respectively, of the second plane P2, it should be appreciated that any risk of the clamp forward engagement portion 42 jamming or snagging may be minimized.

As shown in FIGS. 1, 2, 7 and 8, the clamp 26 may have opposing first and second lateral surfaces 66a, 66b, and the clamp first and second engagement regions 62, 64 may extend between the first and second lateral surfaces 66a, 66b.

Figure 7:
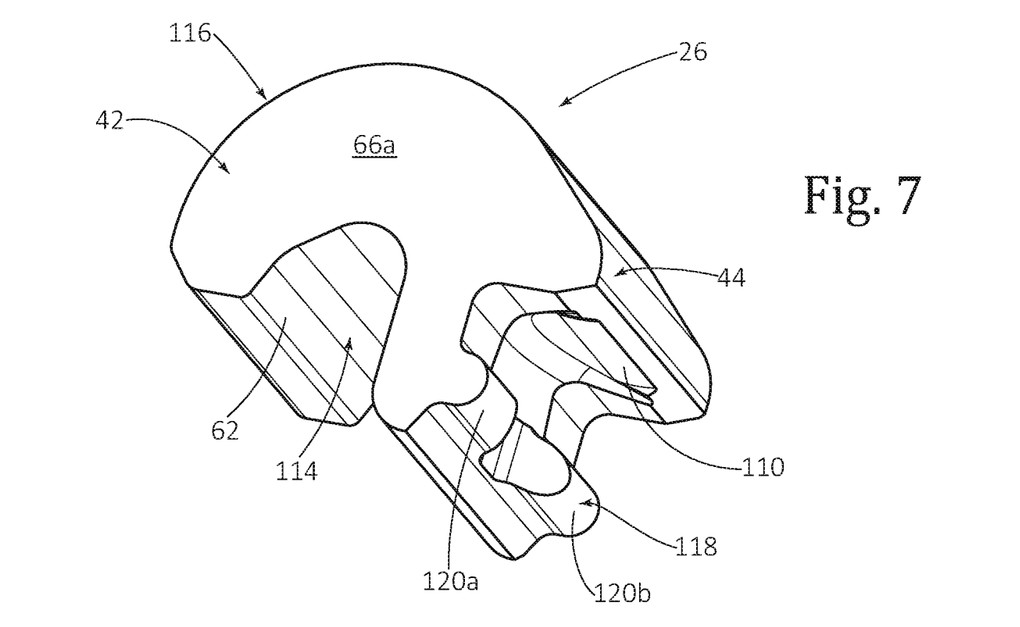
FIG. 7 is a perspective view of a clamp of the tool coupling shown in FIGS. 1 and 2.
Figure 8:
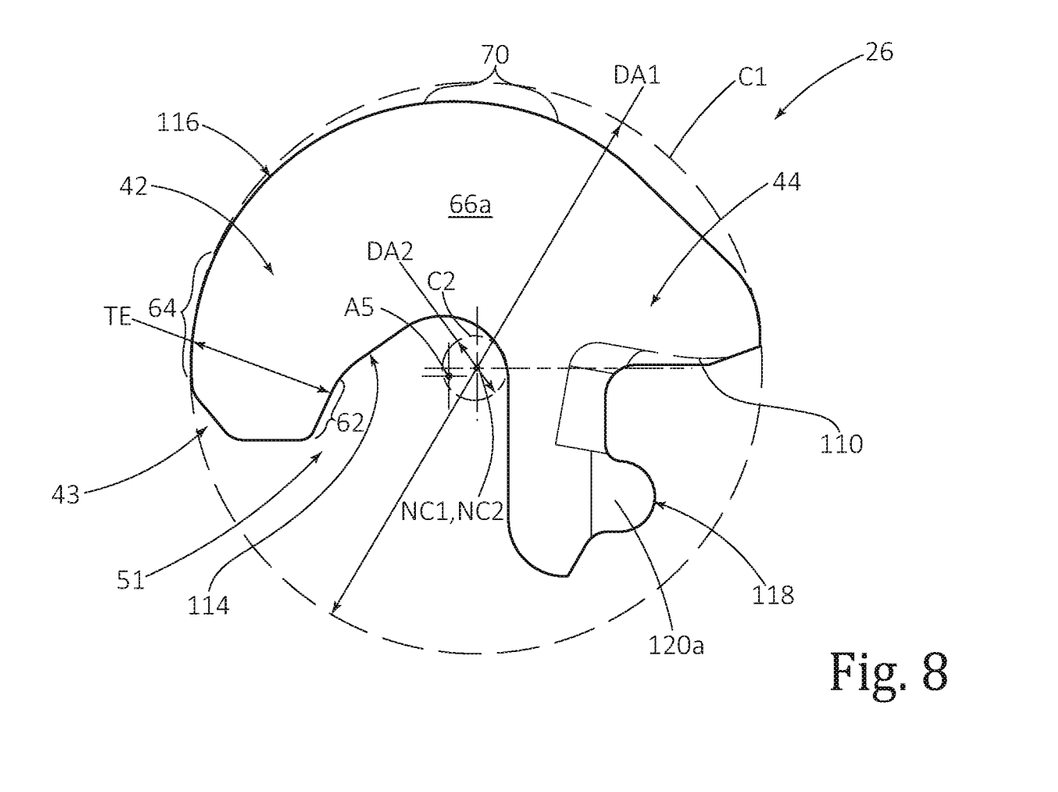
FIG. 8 is a side view of the clamp shown in FIG. 7, with hidden detail.

In some embodiments of the present invention, the clamp second engagement region 64 may intersect the first and second lateral surfaces 66a, 66b.

Also, in some embodiments of the present invention, the first and second clamping side surfaces 66a, 66b may be planar.

As shown in FIGS. 10a, 10b and 12, a lateral axis A2 is defined by the intersection of the first and second planes P1, P2.

In some embodiments of the present invention, the first and second abutment regions 46, 48 may extend along the direction of the lateral axis A2.

As shown in FIGS. 4 and 9, the first abutment region 46 may have a first lateral extent EL1, and in some embodiments of the present invention, the clamp first engagement region 62 may correspondingly extend along the first lateral extent EL1.

For embodiments of the present invention in which the first abutment region 46 intersects the male clamping portion's first and second outer side surfaces 52a, 52b, it should be appreciated that the first lateral extent EL1 may correspond with the width of the male clamping portion 30, i.e. the distance between the first and second outer side surfaces 52a, 52b.

Figure 6:
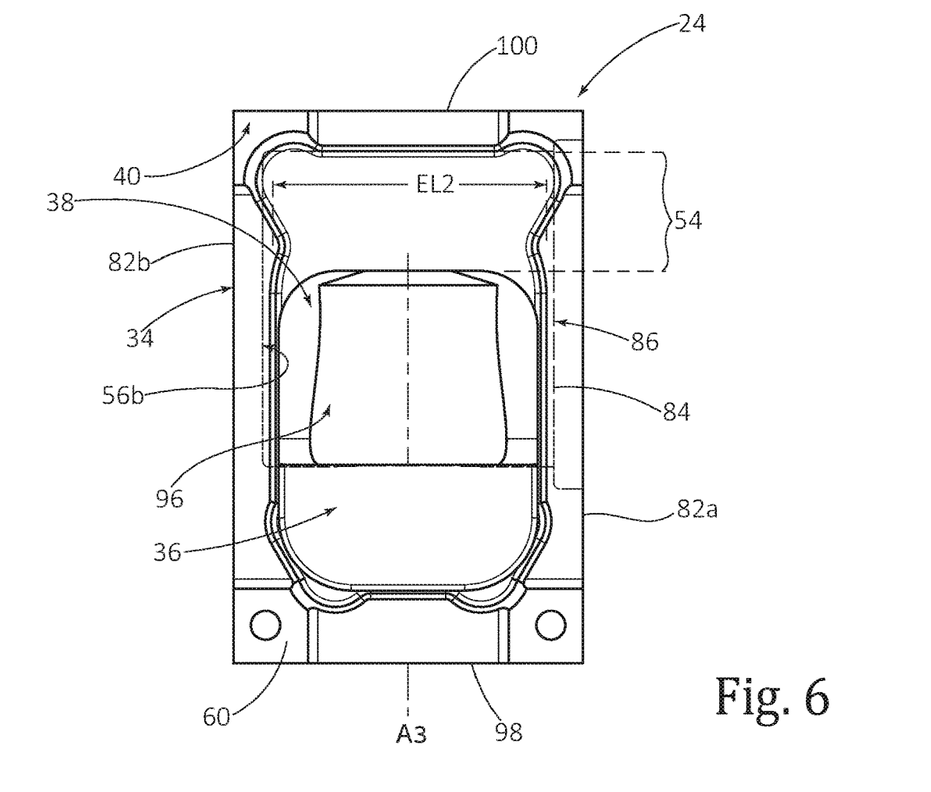
FIG. 6 is an end view of the second component shown in FIG. 5, with hidden detail.

As shown in FIGS. 6 and 9, the second abutment region 48 may have a second lateral extent EL2, and in some embodiments of the present invention, the clamp second engagement region 64 may correspondingly extend along the second lateral extent EL2.

For embodiments of the present invention in which the clamp second engagement region 64 intersects the clamp's first and second lateral surfaces 66a, 66b, it should be appreciated that the second lateral extent EL2 may correspond with the width of the clamp 26, i.e. the distance between the first and second lateral surfaces 66a, 66b.

In some embodiments of the present invention, the second lateral extent EL2 may be greater than the first lateral extent EL1, i.e. EL2>EL1, Also, in some embodiments of the present invention, the first and second abutment regions 46, 48 may parallelly extend along the direction of the lateral axis A2.

For embodiments of the present invention in which the first and second abutment regions 46, 48 parallelly extend along the direction of the lateral axis A2, it should be appreciated that a highly stable clamping configuration may be achieved.

As shown in FIGS. 9, 10a and 10b, a fourth plane P4 perpendicular to the first and second planes P1, P2 may intersect the first abutment region 46 and the second abutment region 48.

In some embodiments of the present invention, the fourth plane P4 may contain the longitudinal axis A1.

As shown in FIGS. 10a and 10b, in a cross-sectional view taken in the fourth plane P4, the clamp first engagement region 62 may be in clamping contact with the first abutment region 46, and the clamp second engagement region 64 may be in clamping contact with the second abutment region 48.

In some embodiments of the present invention, the first and second abutment regions 46, 48 may exhibit mirror symmetry about the fourth plane P4.

Also, in some embodiments of the present invention, the clamp forward engagement portion 42 may exhibit mirror symmetry about the fourth plane P4.

For embodiments of the present invention in which the first and second abutment regions 46, 48 exhibit mirror symmetry about the fourth plane P4, it should be appreciated that a highly stable clamping configuration may be achieved.

As shown in FIG. 10b, in the cross-sectional view taken in the fourth plane P4, the first and second abutment regions 46, 48 have first and second tangent lines TL1, TL2, respectively, and in some embodiments of the present invention, the first and second tangent lines TL1, TL2 may diverge in the upward direction DU.

For embodiments of the present invention in which the first and second tangent lines TL1, TL2 diverge in the upward direction DU, it should be appreciated that the clamp engagement portion's clamp first and second engagement regions 62, 64 form a wedge shape corresponding with the first and second abutment regions 46, 48, respectively.

As shown in FIG. 10b, in the cross-sectional view taken in the fourth plane P4, the first tangent line TL1 may form an external acute first abutment angle β1 with the first plane P1.

In some embodiments of the present invention, first abutment angle β1 may be less than 45 degrees, i.e. β1<45°.

Also, as shown in FIG. 10b, in the cross-sectional view taken in the fourth plane P4, the second tangent line TL2 may form an external acute second abutment angle β2 with the first plane P1.

In some embodiments of the present invention, second abutment angle β2 may be less than 45 degrees, i.e. β2<45°.

It should be appreciated that use of the term "external abutment angle" throughout the description and claims refers to an angle between an abutment region and a plane as measured external to the member on which the abutment region is formed.

As shown in FIGS. 10a, 10b and 12, the inner cavity 38 may have a third abutment region 68 located axially rearward of the first plane P1.

In some embodiments of the present invention, the third abutment region 68 may be located axially rearward of the first abutment region 46.

Also, in some embodiments of the present invention, the third abutment region 68 may be spaced apart from the second abutment region 48.

Further, in some embodiments of the present invention, the third abutment region 68 may extend along the direction of the lateral axis A2.

In the fastened state of the tool coupling 20, a clamp third engagement region 70 of the clamp forward engagement portion 42 may make clamping contact with the inner cavity's third abutment region 68.

In some embodiments of the present invention, the clamp third engagement region 70 may extend between the clamp's first and second lateral surfaces 66a, 66b.

As shown in FIGS. 9, 10a and 10b, the fourth plane P4 may intersect the third abutment region 68.

As shown in FIGS. 10a and 10b, in the cross-sectional view taken in the fourth plane P4, the clamp third engagement region 70 may be in clamping contact with the third abutment region 68.

In some embodiments of the present invention, the third abutment region 68 may exhibit mirror symmetry about the fourth plane P4.

As shown in FIGS. 1 to 3 and 10a, the first body portion 28 may have a front cutting end 72 axially opposite the rear mating end 32, along the longitudinal axis A1.

In some embodiments of the present invention, the front cutting end 72 may have an insert receiving pocket 74, and a cutting insert 76 having at least one cutting edge 78 may be removably secured in the insert receiving pocket 74 by means of an insert screw 79.

Also, in some embodiments of the present invention, the first component 22 may be manufactured from tool steel.

Further, in some embodiments of the present invention, the first component 22 may be produced by means of additive manufacturing.

Yet further, in some embodiments of the present invention, the cutting insert 76 may be manufactured by form pressing and sintering a cemented carbide, such as tungsten carbide, and may be coated or uncoated.

For embodiments of the present invention configured with a front cutting end 72, the tool coupling 20 may be described as a cutting tool 80.

In some embodiments of the present invention, the cutting tool 80 may be used in turning operations.

As shown in FIGS. 5, 6, 9 and 11, the second component 24 may have opposing first and second peripheral side surfaces 82a, 82b.

Figure 5:
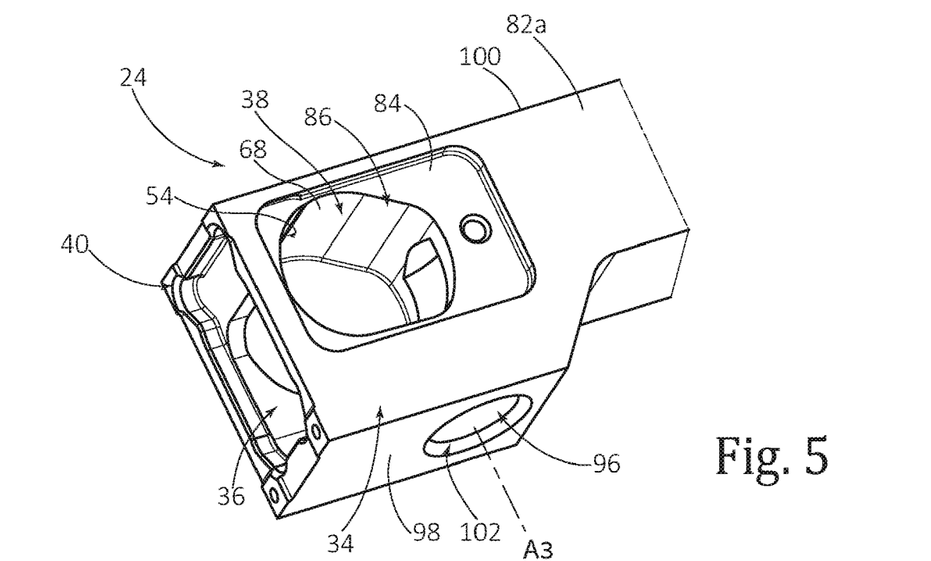
FIG. 5 is a perspective view of a second component of the tool coupling shown in FIGS. 1 and 2.

In some embodiments of the present invention, as shown in FIG. 5, the first peripheral side surface 82a may include a recessed floor surface 84, and the inner cavity 38 may open out to the floor surface 84 and form a side aperture 86.

For embodiments of the present invention, in which the inner cavity 38 opens out to the floor surface 84, it should be appreciated that during pre-assembly of tool coupling 20, the clamp 26 may be slidingly inserted into the inner cavity 38 via the side aperture 86.

As shown in FIGS. 2 and 11, the side aperture 86 may be closed-off by means of a side panel 88, in order to prevent the clamp 26 from inadvertently sliding out of the inner cavity 38.

In some embodiments of the present invention, the side panel 88 may be removably fastened to the floor surface 84 by means of a panel screw 90.

Also, in some embodiments of the present invention, the side panel 88 may have an outer panel surface 92, and when the side panel 88 is fastened to the floor surface 84, the outer panel surface 92 may be flush with the first peripheral side surface 82a.

Further, in some embodiments of the present invention, the side panel 88 may have an inner panel surface 94, and the first inner side surface 56a of the inner cavity 38 may be formed on the inner panel surface 94.

In other embodiments of the present invention (not shown), the second component 24 and the clamp 26 may be simultaneously produced by means of additive manufacturing, such that the clamp 26 may be captively located in the inner cavity 38.

For embodiments of the present invention in which the clamp 26 is captively located in the inner cavity 38, it should be appreciated that the second component 22 may be devoid of a side aperture, and the clamp 26 may be permanently confined to the inner cavity 38.

It should be appreciated that simultaneously producing the second component 24 and the clamp 26 by means of additive manufacturing may provide a more cost-effective production method than conventional production methods.

As shown in FIG. 9, in a top view of the tool coupling 20, the lateral axis A2 may intersect the first and second peripheral side surfaces 82a, 82b to define a body width WB.

In some embodiments of the present invention, at least one of the first and second lateral extents EL1, EL2 may be greater than one third of the body width WB, i.e. EL1>WB/3 and/or EL2>WB/3.

For embodiments of the present invention in which the first and second abutment regions 46, 48 extend along the direction of the lateral axis A2 and at least one of the first and second lateral extents EL1, EL2 is greater than one third of the body width WB, it should be appreciated that a highly robust and stable clamping configuration may be achieved.

In some embodiments of the present invention, each of the first and second lateral extents EL1, EL2 may be greater than half of the body width WB, i.e. EL1>WB/2 and EL2>WB/2.

It should be appreciated that for other embodiments of the present invention (not shown), at least one of the first and second abutment regions 46, 48 may comprise a plurality of abutment sub-regions spaced apart along the direction of the lateral axis A2. For such embodiments, any gaps between abutment sub-regions may be overlooked when measuring the first and second lateral extents EL1, EL2.

As shown in FIGS. 5, 10a and 11, the second component 24 may include a screw bore 96 with a bore axis A3 transverse to the second plane P2.

In some embodiments of the present invention, the bore axis A3 may be perpendicular to the second plane P2.

Also, in some embodiments of the present invention, the bore axis A3 may be contained in the fourth plane P4.

As shown in FIGS. 5, 6 and 10 to 12, the second component 24 may have opposing lower and upper peripheral surfaces 98, 100.

In some embodiments of the present invention, the lower and upper peripheral surfaces 98, 100 may be spaced apart by the first and second peripheral side surfaces 82a, 82b, and the second component 24 may have a square or rectangular profile.

Also, in some embodiments of the present invention, the screw bore 96 may open out to the lower peripheral surface 98 at a bore lower opening 102.

Further, in some embodiments of the present invention, as shown in FIGS. 10 and 12, the lower peripheral surface 98 and the second abutment region 48 may be located on opposite sides of the second plane P2.

As shown in FIGS. 10a and 10b, in some embodiments of the present invention, the screw bore 96 may be entirely located axially rearward of the first abutment region 46.

In some embodiments of the present invention, the screw bore 96 may be located axially rearward of the third abutment region 68.

Also, in some embodiments of the present invention, the screw bore 96 may communicate with the inner cavity 38.

For embodiments of the present invention in which the clamp 26 is captively located in the inner cavity 38 (not shown), it should be appreciated that the only means of communication to the inner cavity 38 may be provided by the female clamping portion 36 and the screw bore 96.

As shown in FIG. 10a, the bore axis A3 may intersect the upper peripheral surface 100 and the bore lower opening 102 to define a body height HB, and the bore lower opening 102 may have a bore center point NB located a first longitudinal distance DL from the rear mating surface 58.

In some embodiments of the present invention, the first longitudinal distance DL may be less than two times the body height HB, i.e. DL<2*HB.

Also, in some embodiments of the present invention, the first longitudinal distance DL may be less than the body height HB, i.e. DL<HB.

As shown in FIGS. 10a and 11, a screw member 104 having a screw axis A4 coaxial with the bore axis A3 may be threadingly engaged in the screw bore 96.

In some embodiments of the present invention, a first screw end 106 of the screw member 104 may have a screw socket 108 to enable a torque key (not shown) to engage and rotate the screw member 104 about the screw axis A4.

Also, in some embodiments of the present invention, the screw socket 108 may be accessible from the second component's lower peripheral surface 98.

For embodiments of the present invention in which the tool coupling 20 is configured as a cutting tool 80, it should be appreciated that locating the bore center point NB a first longitudinal distance DL of less than two times the body height HB from the rear mating surface 58 can be very advantageous for machining arrangements in which the cutting tool 80 is mounted in a tool holder (not shown) with restricted access, and in which it is desirable to have minimal overhang of the front cutting end 72 from the said tool holder, whilst still providing access to the screw socket 108, for example, swiss turning operations.

In other embodiments of the present invention (not shown), the second component 24 and the screw member 104 may be simultaneously produced by means of additive manufacturing, and the screw member 104 may be captively located in the second component 24.

In some embodiments of the present invention, as shown in FIG. 9, rotation of the screw member 104 in a first screw direction DS1 about the screw axis A4 may actuate the clamp rear drive portion 44 to promote fastening of the tool coupling 20.

Also, in some embodiments of the present invention, as shown in FIGS. 9 to 11, rotation of the screw member 104 in the first screw direction DS1 about the screw axis A4 may cause the screw member 104 to travel along the bore axis A3 in the upward direction DU.

Further, in some embodiments of the present invention, as shown in FIGS. 10a, 10b and 11, rotation of the screw member 104 in the first screw direction DS1 about the screw axis A4 may cause the screw member 104 to apply an actuation force FA to a thrust surface 110 of the clamp rear drive portion 44.

As shown in FIGS. 10b and 11, the actuation force FA may be directed in the upward direction DU.

Yet further, in some embodiments of the present invention, a second screw end 112 of the screw member 104 may make contact with the thrust surface 110 when applying the actuation force FA.

As shown in FIGS. 10a and 11, the screw member's second screw end 112 may be axially opposite the first screw end 106, along the screw axis A4.

In some embodiments of the present invention, the bore axis A3 may intersect the thrust surface 110.

Also, in some embodiments of the present invention, the clamp rear drive portion 44 may exhibit mirror symmetry about the fourth plane P4.

For embodiments of the present invention in which bore center point NB is located a first longitudinal distance DL of less than two times the body height HB from the rear mating surface 58, and the bore axis A3 intersects the clamp's thrust surface 110, it should be appreciated that the clamp 26 may have a very compact configuration, thus making it a suitable for tool couplings used in swiss turning operations.

In the fastened state of the tool coupling 20, as shown in FIG. 12, in a side view thereof, the first abutment region 46 and the thrust surface 110 may be located first and second distances D1, D2 from the second abutment region 48 respectively.

It should be appreciated that in the fastened state of the tool coupling 20, the second abutment region 48 may act as a fulcrum about which a turning moment created by a first component of the actuation force FA is converted into a first component of a clamping force FC applied to the first abutment region 46.

As shown in FIG. 10b, the clamping force FC may be directed in the rearward direction DR.

In some embodiments of the present invention, the second distance D2 may be greater than the first distance D1, i.e. D2>D1.

For embodiments of the present invention in which the second distance D2 is greater than the first distance D1, it should be appreciated that the first component of the actuation force FA may be converted into the first component of the clamping force FC with a mechanical advantage.

Also, in some embodiments of the present invention, the second distance D2 may be greater than two times the first distance D1, i.e. D2>2*D1.

For embodiments of the present invention in which the second distance D2 is greater than two times the first distance D1, it should be appreciated that the first component of the actuation force FA may be converted into the first component of the clamping force FC with a significant mechanical advantage, such that a highly robust clamping configuration may be achieved.

As shown in FIG. 12, in the side view of the tool coupling 20, the first and second distances D1, D2 may be measured along imaginary first and second straight lines L1, L2, respectively.

Also, in some embodiments of the present invention, the imaginary first straight line L1 may form an acute imaginary first angle $\alpha 1$ with the longitudinal axis A1, and the imaginary first angle $\alpha 1$ may be greater than 45 degrees, i.e. $\alpha 1 > 45°$.

It should be appreciated that a first moment arm length LM1 (not shown) associated with the first distance D1 is equal to the first distance D1 multiplied by the sine of the imaginary first angle $\alpha 1$, i.e. $LM1 = D1 * \sin \alpha 1$, and thus for embodiments of the present invention in which the imaginary first angle $\alpha 1$ is greater than 45 degrees, the turning moment associated with the first moment arm length LM1 may be advantageously high.

Also, in some embodiments of the present invention, the imaginary second straight line L2 may form an acute imaginary second angle $\alpha 2$ with the bore axis A3, and the imaginary second angle $\alpha 2$ may be greater than 60 degrees, i.e. $\alpha 2 > 60°$.

It should be appreciated that a second moment arm length LM2 (not shown) associated with the second distance D2 is equal to the second distance D2 multiplied by the sine of the imaginary second angle $\alpha 2$, i.e. $LM2 = D2 * \sin \alpha 2$, and thus for embodiments of the present invention in which the imaginary second angle $\alpha 2$ is greater than 60 degrees, the turning moment associated with the second moment arm length LM2 may be advantageously high.

In the fastened state of the tool coupling 20, as shown in FIG. 12, in the side view thereof, the first abutment region 46 and the thrust surface 110 may be located third and fourth distances D3, D4 from the third abutment region 68, respectively.

It should be appreciated that in the fastened state of the tool coupling 20, the third abutment region 68 may act as a fulcrum about which a turning moment created by a second component of the actuation force FA is converted into a second component of the clamping force FC at the first abutment region 46.

In some embodiments of the present invention, the fourth distance D4 may be greater than the third distance D3, i.e. D4>D3.

For embodiments of the present invention in which the fourth distance D4 is greater than the third distance D3, it should be appreciated that the second component of the actuation force FA may be converted into the second component of the clamping force FC with a mechanical advantage.

As shown in FIG. 12, in the side view of the tool coupling 20, the third and fourth distances D3, D4 may be measured along imaginary third and fourth straight lines L3, L4, respectively.

In some embodiments of the present invention, the imaginary third straight line L3 may form an acute imaginary third angle α3 with the longitudinal axis A1, and the imaginary third angle α3 may be greater than 60 degrees, i.e. α3>60°.

It should be appreciated that a third moment arm length LM3 (not shown) associated with the second distance D3 is equal to the third distance D3 multiplied by the sine of the imaginary third angle α3, i.e. LM3=D3*sin α3, and thus for embodiments of the present invention in which the imaginary third angle α3 is greater than 60 degrees, the turning moment associated with the third moment arm length LM3 may be advantageously high.

In some embodiments of the present invention, the clamp 26 may have a swivel axis A5 about which the clamp 26 is rotatable, during fastening and unfastening of the tool coupling 20.

As shown in FIGS. 9 to 12, the swivel axis A5 may be transverse to the longitudinal axis A1 and substantially parallel to the second plane P2.

In some embodiments of the present invention, the swivel axis A5 may be substantially parallel to the lateral axis A2.

Also, in some embodiments of the present invention, it should be appreciated that the swivel axis A5 may not be fixed relative to the second component 24, and when viewed perpendicular to the second plane P2 during fastening and unfastening of the tool coupling 20, the swivel axis A5 may undergo translational movement relative to the second component 24.

As shown in FIGS. 7 and 8, the clamp first and second engagement regions 62, 64 may be disposed on opposing first and second peripheral engagement surfaces 114, 116, respectively, of the clamp forward engagement portion 42.

The clamp 26 has a clamp undercut 51. By virtue of the clamp undercut 51, the clamp's forward engagement portion 42 comprises a clamp hook 43 which, in the tool coupling 20, projects in the forward direction DF.

In the fastened state, the clamp hook 43 is engaged to the male hook 31 and the rear mating surface 58 of the rear mating end 32 makes clamping contact with the forward mating surface 60 of the forward mating end 40. In the unfastened state, the clamp hook 43 is disengaged from the male hook 31. Upon actuation of the screw member 104, which is operatively engaged to the clamp rear drive portion 44, the tool coupling 20 is adjustable between the fastened state and the unfastened state.

As shown in FIG. 8, in a side view of the clamp 26, the first peripheral engagement surface 114 may be outwardly concave and the second peripheral engagement surface 116 may be outwardly convex.

Also, as shown in FIG. 8, in the side view of the clamp 26, the clamp 26 may be kidney shaped.

For embodiments of the present invention in which the clamp 26 is configured with complex surface geometry, for example, the first peripheral engagement surface 114 being outwardly concave and the second peripheral engagement surface 116 being outwardly convex, it should be appreciated that producing the clamp 26 by means of additive manufacturing may provide a more cost-efficient production method than conventional production methods.

As shown in FIG. 8, the side view of the clamp 26 may be taken along the swivel axis A5.

In some embodiments of the present invention, the first peripheral engagement surface 114 may comprise several concave sub-surfaces of differing radii, having a smooth transition therebetween.

For embodiments of the present invention in which the first peripheral engagement surface 114 is outwardly concave and having a smooth transition between concave sub-surfaces of differing radii, it should be appreciated that clamp 26 may be capable of transferring high clamping forces FC to the first abutment region 46 with minimal levels of stress concentration in the vicinity of the first peripheral engagement surface 114.

In some embodiments of the present invention, the clamp third engagement region 70 may be disposed on the convex second peripheral engagement surface 116.

Also, in some embodiments of the present invention, in the side view of the clamp 26, as shown in FIG. 8, the swivel axis A5 may be located outside the clamp 26, and the concave first peripheral engagement surface 114 may face towards the swivel axis A5.

For embodiments of the present invention in which the swivel axis A5 is not fixed relative to the second component 24, and the second peripheral engagement surface 116 is outwardly convex, it should be appreciated that the clamp second and third engagement regions 64, 70 may transitorily slide along the second and third abutment regions 48, 68, respectively, of the inner cavity 38, during fastening and unfastening of the tool coupling 20.

As shown in FIG. 8, in the side view of the clamp 26, an imaginary first circle C1 having a first diameter DA1 and a first center point NC1 circumscribes the clamp 26.

In some embodiments of the present invention, the clamp second engagement region 64 of the second peripheral engagement surface 116 may lie on the imaginary first circle C1.

As shown in FIG. 8, in the side view of the clamp 26, the swivel axis A5 may be located in an imaginary second circle C2 having a second diameter DA2 and a second center point NC2.

In some embodiments of the present invention, the second center point NC2 may be coincident with the first center point NC1.

Also, in some embodiments of the present invention, the swivel axis A5 may not be fixed relative to the clamp 26, and when viewed perpendicular to the second plane P2 during fastening and unfastening of the tool coupling 20, the swivel axis A5 may undergo translational movement within the imaginary second circle C2.

Further, in some embodiments of the present invention, the second diameter DA2 may be less than one quarter of the first diameter DA1.

As shown in FIG. 8, in the side view of the clamp 26, the shortest distance between the clamp second engagement region 64 of the second peripheral engagement surface 116 and the first peripheral engagement surface 114 may define an engagement portion thickness TE, In some embodiments of the present invention, the engagement portion thickness TE may be greater than twenty percent of the first diameter DA1, i.e. TE>0.20*DA1.

For embodiments of the present invention in which the engagement portion thickness TE is greater than twenty percent of the first diameter DA1, it should be appreciated that the clamp 26 may have a high level of rigidity, and thus be capable of transferring high clamping forces FC to the first abutment region 46 with minimal flexing.

In some embodiments of the present invention, rotation of the screw member 104 in a second screw direction DS2 about the screw axis A4 may actuate the clamp rear drive portion 44 to promote unfastening of the tool coupling 20.

As shown in FIG. 9, the second screw direction DS2 may be opposite the first screw direction DS1 about the screw axis A4.

In some embodiments of the present invention, rotation of the screw member 104 in the second screw direction DS2 about the screw axis A4 may cause the screw member 104 to travel along the bore axis A3 in the downward direction DD.

Figure 13A:
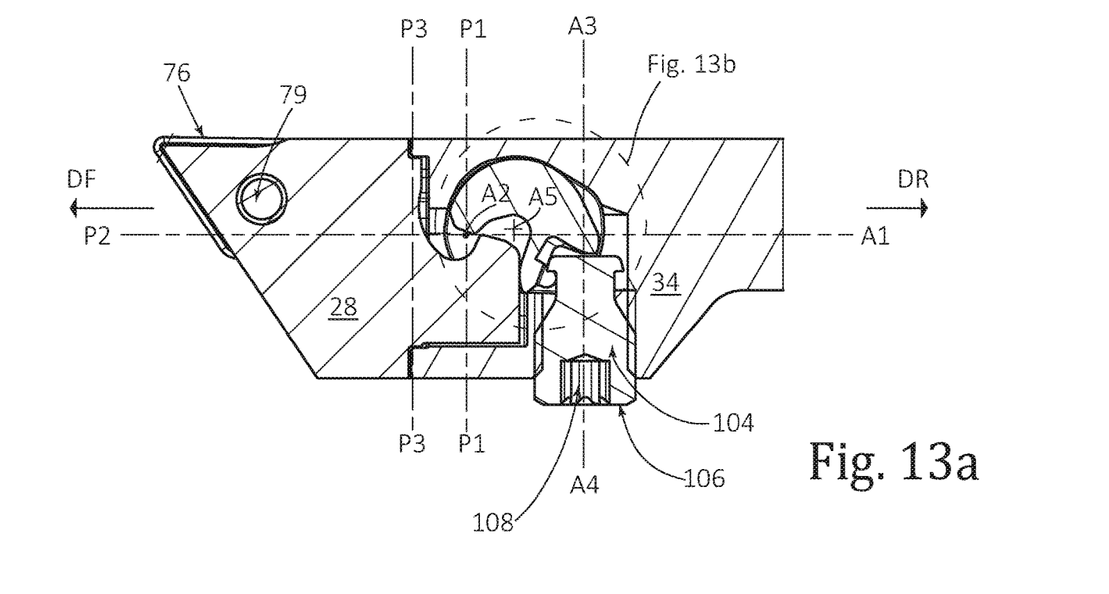
FIG. 13a is a cross-sectional view of the tool coupling shown in FIG. 9, taken along the line XIII-XIII, in an unfastened state.
Figure 13B:
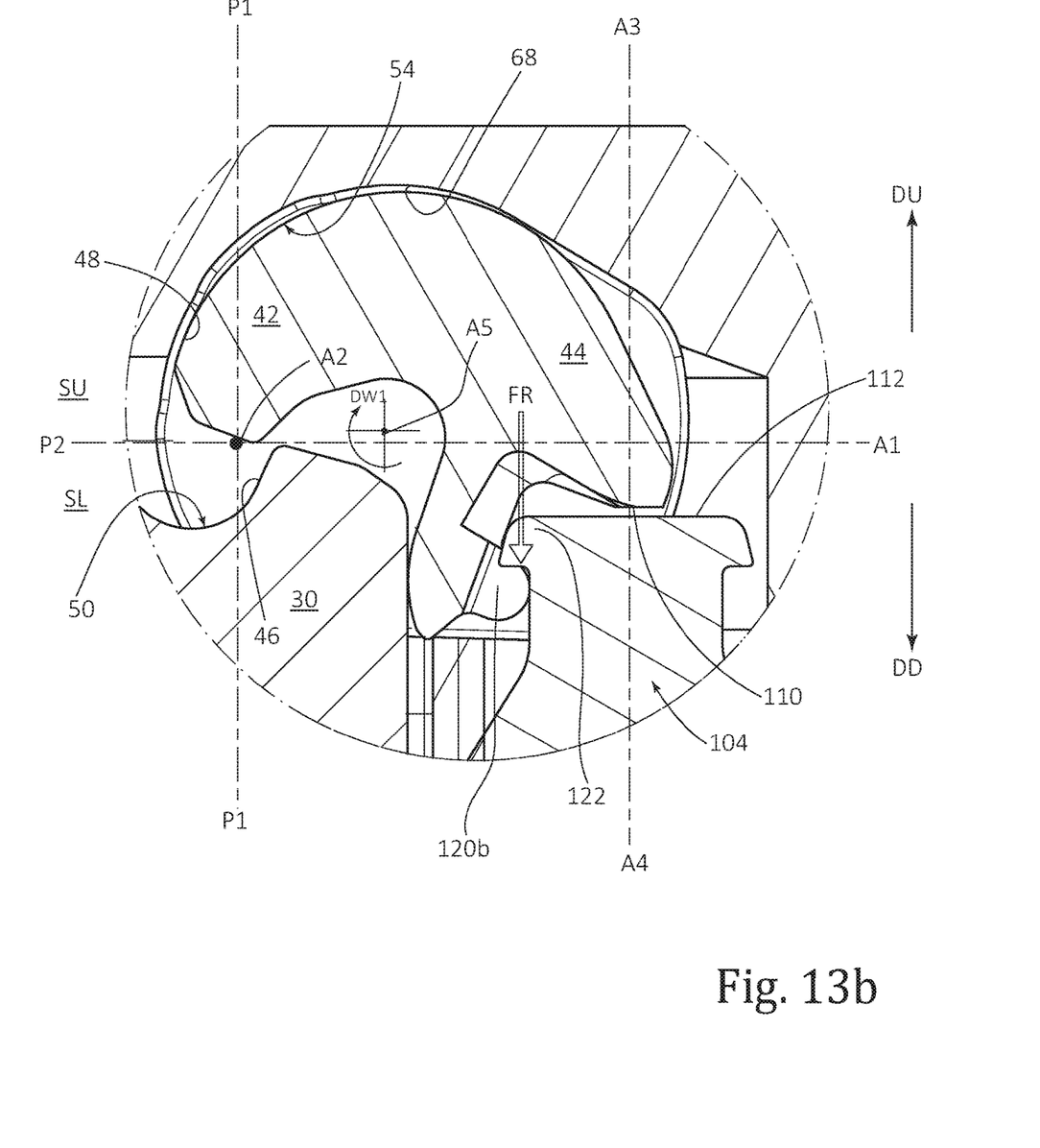

Also, in some embodiments of the present invention, as shown in FIGS. 13a and 13b, rotation of the screw member 104 in the second screw direction DS2 about the screw axis A4 may cause the screw member 104 to apply a release force FR to a pull-back element 118 of the clamp drive portion 44.

As shown in FIG. 13b, the release force FR may be directed in the downward direction DD.

Further, in some embodiments of the present invention, as shown in FIG. 13b, application of the release force FR to the clamp's pull-back element 118 may cause the clamp 26 to rotate in a first swivel direction DW1 about the swivel axis A5.

As shown in FIGS. 7 and 8, the pull-back element 118 may be spaced apart from the thrust surface 110.

In some embodiments of the present invention, as shown in FIGS. 12 and 13b, the pull-back element 118 may be in the form of at least one pull-back protuberance 120a, 120b, extending transversely with respect to the screw axis A4.

Also, in some embodiments of the present invention, as shown in FIG. 11, the pull-back element 118 may comprise first and second pull-back protuberances 120a, 120b, located on opposite sides of the fourth plane P4.

As shown in FIGS. 13a and 13b, the screw member 104 may have a screw shoulder 122 adjacent the second screw end 112, and the screw shoulder 122 may make contact with the at least one pull-back protuberance 120a, 120b when applying the release force FR.

In some embodiments of the present invention, as shown in FIGS. 13a and 13b, rotation of the screw member 104 in the second screw direction DS2 about the screw axis A4 may cause the second screw end 112 to become spaced apart from the thrust surface 110.

For embodiments of the present invention in which the clamp first and second engagement regions 62, 64 are disposed on opposing concave first and convex second peripheral engagement surfaces 114, 116, respectively, it should be appreciated that any risk of the clamp forward engagement portion 42 jamming or snagging may be minimized, and the magnitude of the release force FR required to rotate screw member 104 in the second screw direction DS2 and promote unfastening of the tool coupling 20 may be relatively small.

As shown in FIGS. 13a and 13b, in the unfastened state of the tool coupling 20, the clamp forward engagement portion 42 may be spaced apart from the first abutment region 46.

Also, as shown in FIGS. 13a and 13b, in the unfastened state of the tool coupling 20, the clamp forward engagement portion 42 may be spaced apart from the entire male clamping portion 30 and located on the upper side SU of the second plane P2.

Further, as shown in FIGS. 13a and 13b, in the unfastened state of the tool coupling 20, the clamp forward engagement portion 42 may be spaced apart from the second abutment region 48.

In some embodiments of the present invention, in the unfastened state of the tool coupling 20, the first component 22 may be slidably removable from the second component 24 along the longitudinal axis A1.

During subsequent refastening of the tool coupling 20, it should be appreciated that application of the actuation force FA to the clamp's thrust surface 110 may cause the clamp 26 to rotate in a second swivel direction DW2 about the swivel axis A5.

As shown in FIGS. 10b and 13b, the second swivel direction DW2 may be opposite the first swivel direction DW1 about the swivel axis A5.

Although the present invention has been described to a certain degree of particularity, it should be understood that various alterations and modifications could be made without departing from the spirit or scope of the invention as hereinafter claimed.

What is claimed is:

1. A tool coupling (20) extending in a forward-to-rearward direction (DF, DR) along a longitudinal axis (A1), and having a first plane (P1) perpendicular to the longitudinal axis (A1) and a second plane (P2) containing the longitudinal axis (A1) and transverse to the first plane (P1), the second plane (P2) having an upper side (SU) defining an upward direction (DU) of the tool coupling (20) and a lower side (SL) which is opposite to the upper side (SU) and defines a downward direction (DD) of the tool coupling (20), the tool coupling (20) comprising:

a first component (22), a second component (24), and a clamp (26) for fastening the first component (22) to the second component (24), the first component (22) having a first body portion (28) and a male clamping portion (30) extending from a rear mating end (32) of the first body portion (28) in the rearward direction (DR), the second component (24) having a second body portion (34), a female clamping portion (36), and an inner cavity (38), the female clamping portion (36) opening out to a forward mating end (40) of the second body portion (34) and the inner cavity (38) communicating with the female clamping portion (36), and the clamp (26) located in the inner cavity (38) and having a clamp forward engagement portion (42) and a clamp rear drive portion (44), the clamp forward engagement portion (42) having a clamp first engagement region (62) and a clamp second engagement region (64), wherein:

the male clamping portion (30) occupies the female clamping portion (36) and has a first abutment region (46) located axially rearward of the first plane (P1);

the inner cavity (38) has a second abutment region (48) located axially forward of the first plane (P1), the second abutment region (48) being located on the upper side (SU) of the second plane (P2);

each of the first and second abutment regions (46, 48) faces towards the first plane (P1); and in a fastened state of the tool coupling (20):

a rear mating surface (58) of the rear mating end (32) makes clamping contact with a forward mating surface (60) of the forward mating end (40);

the clamp first engagement region (62) makes clamping contact with the male clamping portion's first abutment region (46); and the clamp second engagement region (64) makes clamping contact with the inner cavity's second abutment region (48).

2. The tool coupling (20) according to claim 1, wherein:
the second component (24) includes a screw bore (96) with a bore axis (A3) transverse to the second plane (P2),
a screw member (104) having a screw axis (A4) coaxial with the bore axis (A3) is threadingly engaged in the screw bore (96), and
rotation of the screw member (104) in a first screw direction (DS1) about the screw axis (A4) actuates the clamp rear drive portion (44) to promote fastening of the tool coupling (20).

3. The tool coupling (20) according to claim 2, wherein rotation of the screw member (104) in the first screw direction (DS1) about the screw axis (A4) causes the screw member (104) to travel along the bore axis (A3) in the upward direction (DU).

4. The tool coupling (20) according to claim 2, wherein:
the second component (24) has opposing lower and upper peripheral surfaces (98, 100), and
the screw bore (96) opens out to the lower peripheral surface (98) at a bore lower opening (102).

5. The tool coupling (20) according to claim 4, wherein the lower peripheral surface (98) and the second abutment region (48) are located on opposite sides of the second plane (P2).

6. The tool coupling (20) according to claim 4, wherein:
the bore axis (A3) intersects the upper peripheral surface (100) and the bore lower opening (102) to define a body height (HB),
the bore lower opening (102) has a bore center point (NB) located a first longitudinal distance (DL) from the rear mating surface (58), and
the first longitudinal distance (DL) is less than two times the body height (HB).

7. The tool coupling (20) according to claim 2, wherein rotation of the screw member (104) in the first screw direction (DS1) about the screw axis (A4) causes the screw member (104) to apply an actuation force (FA) to a thrust surface (110) of the clamp rear drive portion (44).

8. The tool coupling (20) according to claim 7, wherein in the fastened state of the tool coupling (20), and in a side view thereof:
the first abutment region (46) and the thrust surface (110) are located first and second distances (D1, D2) from the second abutment region (48), respectively, and
the second distance (D2) is greater than the first distance (D1).

9. The tool coupling (20) according to claim 8, wherein:
the second distance (D2) is greater than two times the first distance (D1).

10. The tool coupling (20) according to claim 2, wherein rotation of the screw member (104) in a second screw direction (DS2) about the screw axis (A4) actuates the clamp rear drive portion (44) to promote unfastening of the tool coupling (20).

11. The tool coupling (20) according to claim 10, wherein rotation of the screw member (104) in the second screw direction (DS2) about the screw axis (A4) causes the screw member (104) to apply a release force (FR) to a pull-back element (118) of the clamp rear drive portion (44).

12. The tool coupling (20) according to claim 10, wherein in the unfastened state of the tool coupling (20):
the clamp forward engagement portion (42) is spaced apart from the entire male clamping portion (30) and located on the upper side (SU) of the second plane (P2).

13. The tool coupling (20) according to claim 10, wherein in the unfastened state of the tool coupling (20):
the first component (22) is slidably removable from the second component (24) along the longitudinal axis (A1).

14. The tool coupling (20) according to claim 1, wherein:
a lateral axis (A2) is defined by the intersection of the first and second planes (P1, P2), and
the first and second abutment regions (46, 48) extend along the direction of the lateral axis (A2).

15. The tool coupling (20) according to claim 14, wherein:
the second component (24) has opposing first and second peripheral side surfaces (82a, 82b),
the lateral axis (A2) intersects the first and second peripheral side surfaces (82a, 82b) to define a body width (WB),
the first and second abutment regions (46, 48) have first and second lateral extents (EL1, EL2), respectively, and
at least one of the first and second lateral extents (EL1, EL2) is greater than one third of the body width (WB).

16. The tool coupling (20) according to claim 15, wherein each of the first and second lateral extents (EL1, EL2) is greater than half of the body width (WB).

17. The tool coupling (20) according to claim 1, wherein:
the inner cavity (38) has a third abutment region (68) located axially rearward of the first plane (P1), and
in the fastened state of the tool coupling (20), a clamp third engagement region (70) of the clamp forward engagement portion (42) makes clamping contact with the inner cavity's third abutment region (68).

18. The tool coupling (20) according to claim 17, wherein the inner cavity's third abutment region (68) is located axially rearward of the first abutment region (46).

19. The tool coupling (20) according to claim 1, wherein the clamp (26) has a swivel axis (A5) about which the clamp (26) is rotatable.

20. The tool coupling (20) according to claim 19, wherein:
the clamp first and second engagement regions (62, 64) are disposed on opposing first and second peripheral engagement surfaces (114, 116), respectively, of the clamp forward engagement portion (42), and
in a side view of the clamp (26), the first peripheral engagement surface (114) is outwardly concave and the second peripheral engagement surface (116) is outwardly convex.

21. The tool coupling (20) according to claim 20, wherein in the side view of the clamp (26):
an imaginary first circle (C1) having a first diameter (DA1) and a first center point (NC1) circumscribes the clamp (26),
the swivel axis (A5) is located in an imaginary second circle (C2) having a second diameter (DA2) and a second center point (NC2),
the second center point (NC2) is coincident with the first center point (NC1), and
the second diameter (DA2) is less than one quarter of the first diameter (DA1).

22. The tool coupling (20) according to claim 21, wherein in the side view of the clamp (26):
the shortest distance between the clamp second engagement region (64) of the second peripheral engagement surface (116) and the first peripheral engagement surface (114) defines an engagement portion thickness (TE), and the engagement portion thickness (TE) is greater than twenty percent of the first diameter (DA1).

23. The tool coupling (20) according to claim 20, wherein in the side view of the clamp (26):

the swivel axis (A5) is located outside the clamp (26), and the concave first peripheral engagement surface (114) faces towards the swivel axis (A5).

24. The tool coupling (20) according to claim 19, wherein the swivel axis (A5) is transverse to the longitudinal axis (A1) and substantially parallel to the second plane (P2).

25. A tool coupling (20) extending in a forward-to-rearward direction (DF, DR) along a longitudinal axis (A1), and comprising:

a forward component (22) having a first body portion (28) and a male clamping portion (30) extending from a rear mating end (32) of the first body portion (28) in the rearward direction (DR), the male coupling portion (30) comprising a male hook (31) projecting in the rearward direction (DR);

a rear component (24) having a second body portion (34), a female clamping portion (36), and an inner cavity (38), the female clamping portion (36) opening out to a forward mating end (40) of the second body portion (34) and the inner cavity (38) communicating with the female clamping portion (36); and a clamp (26) located in the inner cavity (38), the clamp (26) having a clamp forward engagement portion (42) and a clamp rear drive portion (44), the clamp forward engagement portion (42) comprising a clamp hook (43) which projects in the forward direction (DF);

wherein;

the male clamping portion (30) occupies the female clamping portion (36); and upon actuation of a screw member (104) operatively engaged to the clamp rear drive portion (44), the tool coupling (20) is adjustable between a fastened state in which:

the clamp hook (43) is engaged to the male hook (31); and a rear mating surface (58) of the rear mating end (32) makes clamping contact with a forward mating surface (60) of the forward mating end (40);

an unfastened state in which:

the clamp hook (43) is disengaged from the male hook (31), and wherein:

actuation of the screw member (104) about a screw axis (A4) results in rotation of the clamp (26) about a swivel axis (A5) transverse to the longitudinal axis (A1); and the swivel axis (A5) is not fixed relative to the rear component (24).

26. The tool coupling (20) according to claim 25, wherein:

during fastening and unfastening of the tool coupling (20), the swivel axis (A5) undergoes translational movement relative to the rear component (24).

27. The tool coupling (20) according to claim 25, wherein:

the tool coupling (20) has a first plane (P1) perpendicular to the longitudinal axis (A1) and a second plane (P2) containing the longitudinal axis (A1) and transverse to the first plane (P1), the second plane (P2) having an upper side (SU) defining an upward direction (DU) of the tool coupling (20) and a lower side (SL) which is opposite to the upper side (SU) and defines a downward direction (DD) of the tool coupling (20);

the clamp forward engagement portion (42) has a clamp first engagement region (62) and a clamp second engagement region (64);

the male clamping portion (30) has a first abutment region (46) located axially rearward of the first plane (P1);

the inner cavity (38) has a second abutment region (48) located axially forward of the first plane (P1), the second abutment region (48) being located on the upper side (SU) of the second plane (P2);

each of the first and second abutment regions (46, 48) faces towards the first plane (P1); and in a fastened state of the tool coupling (20):

the clamp first engagement region (62) makes clamping contact with the male clamping portion's first abutment region (46); and the clamp second engagement region (64) makes clamping contact with inner cavity's second abutment region (48).

* * * * *